Feb. 11, 1936. W. A. MOFFAT 2,030,757
AUTOMOBILE SIGNAL
Filed Dec. 26, 1934
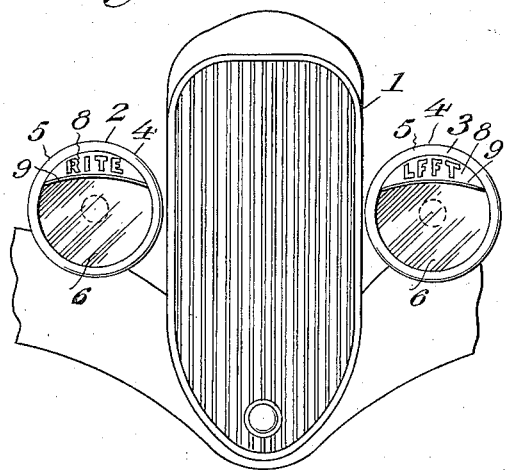
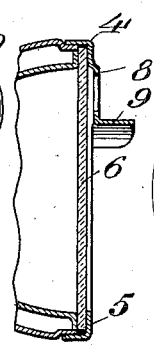
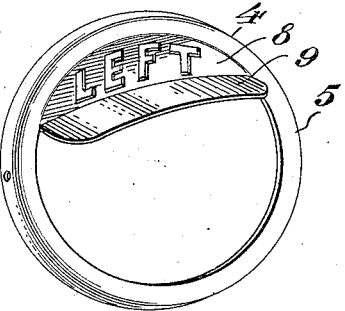
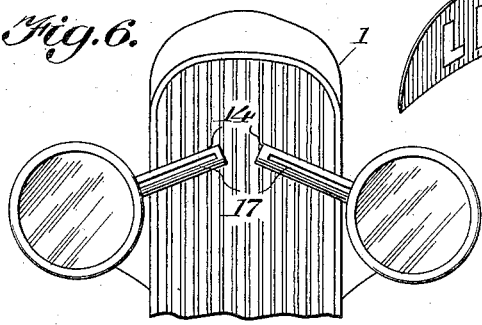
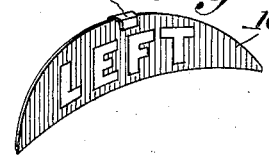
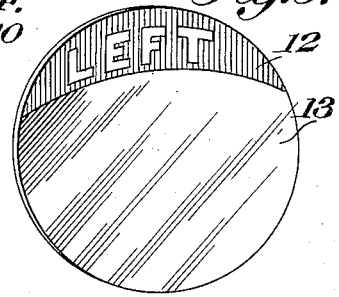
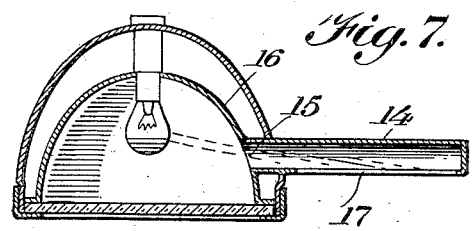
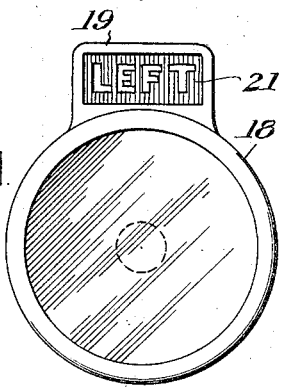
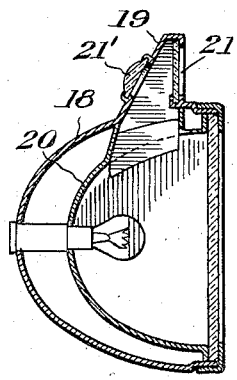
Walter A. Moffat
INVENTOR
BY Victor J. Evans & Co.
ATTORNEYS Patented Feb. 11, 1936

2,030,757

UNITED STATES PATENT OFFICE 2,030,757

AUTOMOBILE SIGNAL

Walter A. Moffat, Meridian, Miss., assignor to Auto Headlight Signal Company, Meridian, Miss., a corporation of Mississippi Application December 26, 1934, Serial No. 759,269

1 Claim. (Cl. 40—131)

This invention relates to headlight indicators for motor vehicles and has for the primary object the provision of means for clearly and unmistakably showing to approaching motorists and pedestrians which headlight of the motor vehicle is extinguished due to some defect, so that the approaching motorist or pedestrian can determine accurately the distance which must be allowed to pass the motor vehicle with safety.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary front elevation illustrating a motor vehicle with the headlights thereof equipped with indicators constructed in accordance with my invention.

Figure 2 is a perspective view illustrating one of the indicators.

Figure 3 is a fragmentary sectional view showing the mounting of the indicator to the headlight.

Figure 4 is a perspective view illustrating the modified form of indicator.

Figure 5 is a perspective view illustrating another modified form of my invention wherein the indicator forms an integral part of the lens of the headlight.

Figure 6 is a fragmentary front elevation illustrating another modified form of my invention applied to the headlights.

Figure 7 is a horizontal sectional view showing the form of indicator disclosed by Figure 6.

Figure 8 is a front elevation illustrating another modified form of my invention.

Figure 9 is a vertical sectional view illustrating the same.

Referring to the drawing in detail, the numeral 1 indicates a fragmentary portion of the front end of a motor vehicle wherein the right and left headlights are indicated by the characters 2 and 3. At night time and when one of the headlights becomes extinguished due to some defect, it is very difficult for an approaching motorist or pedestrian to determine which headlight is extinguished and, therefore, cannot readily judge accurately the distance which must be allowed in order to pass the motor vehicle with safety. In order that the motorist or pedestrian approaching the vehicle may readily determine which headlight is extinguished, it is proposed to adapt to the headlights indicators 4, one which shows the word "right" and the other showing the word "left."

Each indicator includes a rim 5 employed for securing the lens of the headlight to the body 7 of said headlight and has formed integrally therewith and at the upper portion a plate 8 which overlies a portion of the lens and has stenciled therein or struck therefrom letters spelling either the word "right" or "left" so that some of the rays of light of the headlight will pass through them rendering them readable a considerable distance from the motor vehicle. A portion of the plate 8 may be angularly disposed to form a visor 9. Any suitable fastening means may be employed for securing the rim 5 to the body 7 of the headlight and it is preferable that the fastening means be of such a nature that it will only fit the headlight which it is designed for so that the possibility of applying an indicator to the wrong headlight will be obviated.

Referring to my modified form of invention, as shown in Figure 4, the indicator may be in the form of a plate 10 carrying a suitable clamp 11 to engage with an edge of the lens of a headlight for supporting the plate thereto. The plate 10 has the characters or letters of a word stenciled therein so that a portion of the light rays from the headlight may pass through the letters.

As shown in Figure 5, the indicator 12 may form a part of the lens 13 by coating a portion of the latter with some suitable opaque material leaving the letters transparent.

Referring to the modified form of my invention, as shown in Figures 6 and 7, the indicator is in the form of a tube 14 suitably secured to the body of the headlight and extending into the latter and communicating with an opening 15 formed in the reflector 16 of the headlight so that some of the rays of light of the headlight may enter the tube and be seen through a slot 17 formed in the tube. The headlights are shown in Figure 6 and equipped with the tubes 14 have said tubes inclining upwardly and towards each other and terminating adjacent the longitudinal axis of the motor vehicle so that should one of the headlights become extinguished an approaching motorist or pedestrian may readily determine by the illuminated indicator which of the headlights is extinguished due to the direction in which the illuminated tube or indicator points.

Referring to my modified form of invention, as shown in Figures 8 and 9, the body 18 of the headlight has formed therewith a hood 19 projecting upwardly from the body 18 rearwardly of the lens.

The hood 19 extends into the body of the headlight and the reflector 20 thereof so that light rays may enter the hood. The front of the hood is in the form of a window closed by an indicator plate 21 in which are stenciled the letters spelling "right" or "left." The rear wall of the hood may have set therein a lens 21 through which light rays may escape in a rearward direction with respect to the headlight so that the driver of the motor vehicle may at all times see that the headlights are illuminated.

Having described the invention, I claim:

An indicator for headlights comprising a plate to overlie a portion of a lens of a headlight and having stenciled letters spelling either the word "left" or "right" adapted to permit light rays of the headlight to pass therethrough to render said words readable at night time, and means for securing said plate to the headlight for supporting the plate in front of a lens of the headlight, said plate having an angularly disposed portion at the edge of said plate below the letters to form a visor.

WALTER A. MOFFAT.